April 15, 1930.  A. ROITZHEIM ET AL  1,755,076
FURNACE FOR TREATING ZINC ORES AND OTHER ZINCIFEROUS MATERIAL
Filed April 23, 1926   3 Sheets-Sheet 3
Fig.3.
Fig.5.
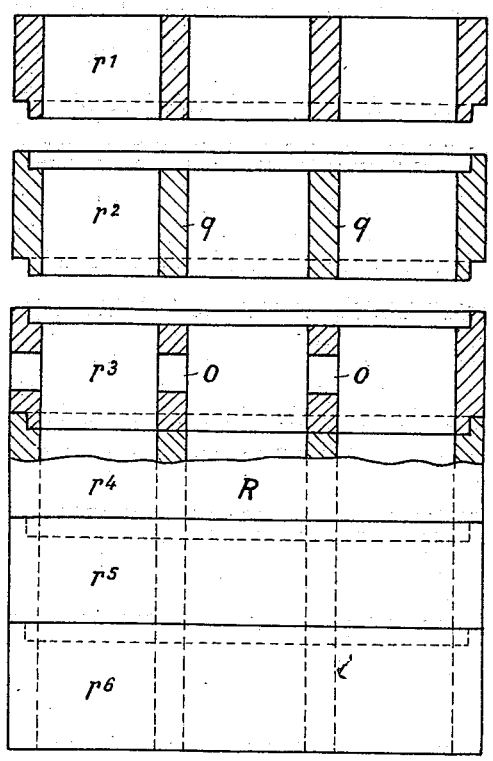
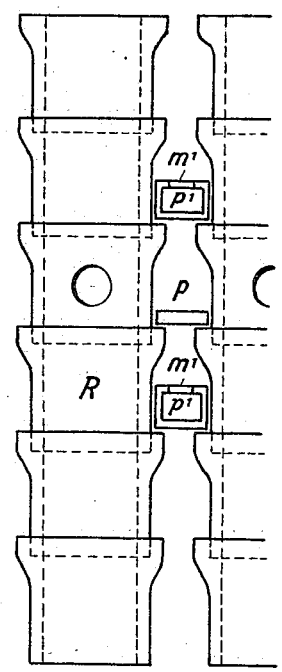
Fig.4.
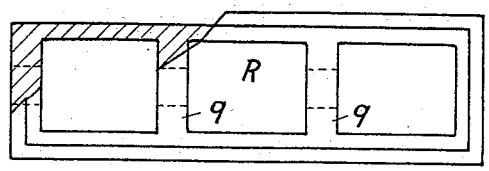
Alexander Roitzheim
Wilhelm Remy
Inventors
By Byrnes Townsend Brickenstein
Attys.

Patented Apr. 15, 1930

1,755,076

UNITED STATES PATENT OFFICE

ALEXANDER ROITZHEIM AND WILHELM REMY, OF BERLIN-OBERSCHONEWEIDE, GERMANY

FURNACE FOR TREATING ZINC ORES AND OTHER ZINCIFEROUS MATERIAL

Application filed April 23, 1926, Serial No. 104,147, and in Germany November 13, 1925.

This invention relates to a method of and to a furnace for treating zinc ores and other zinciferous material in vertical reduction chambers or muffles in a continuous working operation.

Attempts to solve the problem of producing zinc in vertical muffles have been made for decades past and consequently numerous proposals have been made, part of which have merely been published whilst others have been tried in practice. Nevertheless the zinc industry throughout the world at present works for the most part with muffles arranged horizontally in the furnace. It follows from this that no practical solution of the problem has hitherto been found.

Why is this? The technical advance in metallurgy can only lie in the increased simplification of the apparatus in which the metallurgical processes are carried out and in the decrease in human labour.

When, in the history of zinc-production it was first suggested to employ a vertical muffle instead of a horizontal muffle, it was probably primarily only due to the wish to reduce the action of the slags segregated from the charge which, in horizontal muffles, destroyed the bottom of the muffle too rapidly. Lately when the idea of vertical muffles was repeatedly reopened the obvious possibility of facilitating charging and discharging by means of a vertical muffle, was aimed at.

In the old method however the metallurgical treatment in vertical muffles was not rendered uninterrupted. The vertical muffle had to be opened at the top and at the bottom, on discharging. It was found that the work was far worse than in the old methods because the workmen who opened the lower muffle were exposed to a spray of incandescent slag and the workmen who had to make the upper opening were exposed to the flue action of the hot muffle tubes which conducted fume and heat towards them.

Moreover also in continuous operations in vertical muffles in which the charge uninterruptedly passes through the vertical muffle in a slow current, in spite of undeniable improvements, a detrimental disadvantage in the operation of the furnace nevertheless remained, because destroyed muffles had to be replaced in the same way as in the case of horizontal muffles. For this purpose, in the case of vertical muffles, the furnace had to be opened at the top and bottom at those places where the muffles had to be inserted. This entails considerable difficulties so that the superiority of the uninterrupted metallurgical treatment in the vertical muffle was again counteracted.

The above-described difficulties however become excessive if it is necessary to employ muffles of a larger size in order to ensure a sufficient daily production.

The weight of the muffles to be brought to incandescence in tempering furnaces could be overcome by mechanical means, but not the breaking out of the destroyed muffle. This necessitates the employment of very strong and courageous workmen.

The question might be raised as to whether this difficulty could not be overcome by bricking the muffles together. Proposals to this effect have already been made long since. However in view of the unavoidable movement of the furnace, expansion by heat, as well as the swelling and shrinkage of the refractory masonry, the walls of the muffles cannot be made tight in the vertical joints even by providing groove and tongue joints. Also the necessary, and even in the extreme case, still considerable thickness of the stone, conducts the heat far too badly as compared with thin walled clay muffles. Consequently brick muffles have also everywhere proved unsuccessful.

According to the invention the operation and the construction of the furnace are such that the same remains in operation for a prolonged period undisturbed by any replacement of the muffles, with continuously uniform firing, irrespective as to whether any muffles have become faulty and the furnace is only cooled down when a certain number (about $\frac{1}{5}$ to $\frac{1}{4}$) of the muffles arranged in the furnace have been destroyed. After complete cooling the muffles are removed from the furnace and cold muffles, in an unburnt or initially tempered state, are freshly inserted, whereupon it is reheated for a new working operation. If, after a certain time, one or other of the muffles should become faulty, it is, instead of being charged with ore, filled with a refractory substance such as for example fire-clay or sand, and remains in the furnace. This is continued until the number of the faulty and therefore unproductive muffles has become so great that a further operation of the furnace would be uneconomical, whereupon the fire is drawn without regard to the number of muffles present which are still in a good condition.

By mounting the muffles in a cold state a large muffle can be composed either of several adjacent small muffles connected together horizontally by means of several tubular members so that the zinc vapours evolved can be removed through a flue to a common receiver in the front wall of the furnace, or the large muffle may be divided horizontally into separate parts or sections, the construction of which offers no practical difficulties, these being then mounted in the furnace one above the other with horizontal joints. The weight of these muffles, as experience has shown, tightens these joints which are smeared out by means of a friable mortar.

A weak point in vertical muffles is in general, the carrying capacity of the refractory wall material. All vertical muffles have a tendency to belly out in the furnace. The prolonging of the life of the muffles under such conditions, to such an extent as to provide for a periodical process with practical success can only be solved by the insertion of skeletons or by forming the profile of the muffle of thin walls exposed to the fire and thick middle cheeks which are not directly exposed to the fire and which, so to speak, form a spine for the muffle.

Only the periodical reinsertion of the muffles in the cold furnace allows such manipulations. By this means it is possible to employ muffles of a height of two or even three metres. If it were attempted to temper such muffles outside the furnace and to insert them into the hot furnace, then, owing to the highly irregular division of the material and to the non-uniform cooling, unavoidable stresses of the muffle would be produced in the muffles during transport, which would lead to their cracking. The periodical process however affords a freedom in the shape of the muffle which would otherwise be impossible.

Inasmuch as in the new furnace only relatively moderate temperatures may prevail greater value must be attached to a very uniform distribution of the temperature in that part of the muffle where the reduction of the ore proceeds i. e. the flame must be homogeneous in the combustion chamber between the individual muffles and may not have any appreciable fall in temperature. This is best attained by adding the combustion air to the gas in stages and by correspondingly adjusting the flames.

The provision of the cold furnace with muffles in the cold state permits the insertion of flues for this purpose, between the outer walls of the muffles and enables the combustion air to be distributed along the path of the gas through inserted perforated tubes or hollow stones employed for the formation of the heating flues.

Owing to the fact that the insertion of the flues between the muffles, has fixed the path of the fire, the further construction of the furnace becomes very simple.

A dome for the chamber in which the muffles are located is dispensed with. The muffles rest upon an iron supporting construction and carry their own top covers. Since the muffles, by means of interposed plates, form flues for the passage of the flame, the channels for the admission and discharge of the heating and combustion gases can be united into a common masonry block which also surrounds the gas producers and the air preheaters for the combustion air. The surrounding walls of the furnace are entirely devoid of flues and contain only inspection holes for the inspection of the muffles. Only the wall opposite the centre block of each side contains a niche for the receivers for condensing the zinc vapours. The muffles are mounted entirely independently of the furnace masonry upon an iron supporting construction, which is protected from the action of the fire by a layer of fire clay or sand placed at a height of 0.40 metres outside the lower portion of the muffles.

Thus, the very essential conditions that the muffles remain entirely independent of any movement of the furnace brick work, that they are able to contract or expand entirely independently and that they are not exposed to any forces which may be produced by any displacement of the highly heated furnace brick work, are fulfilled in a most simple manner. This circumstance is very important for the life of the muffle.

Without construction in the cold, the flue for the flame could only have been conducted from one wall of the furnace to an opposite one. The muffles would then be arranged between these two walls. The gas inlet and outlet would have been spacially separated. As compared with this the concentration of the channel work in one block, constitutes an advance in the metallurgy of zinc, in respect of heat utilization and construction.

By this arrangement of all the channels, of the air heating chambers, and of the fire in one central furnace block, a kind of heat accumulator is formed which compensates for fluctuations in the heat which are produced by drawing the fires, charging fresh fuel and the like. This is a great advantage for the muffles and contributes to prolonging their life.

When the muffles are destroyed, the fire must be drawn and the furnace cooled until it is again fitted with new muffles. The heating of the muffles must proceed slowly. This is preferably effected by grate fires. Degasified carbon or coke is employed for the first heating serving to temper the muffles. The incandescent heat spreads slowly through the central block of masonry and as soon as this block has itself become incandescent, the heat is transmitted to the muffles. The muffles are thus heated very gradually and very uniformly, which takes about a week. When the muffles are at red heat, there is no longer any danger and new gas and combustion air can be introduced into the flues and the operation can be started.

The requisite heat for the operation of the furnace can be produced in the same grate as the preheating. In order uniformly to spread the fire to the furnace, it has been found useful to distribute the combustion amongst four fires instead of one large fire. This uniform distribution of the fire is essential when reheating the cold furnace. It is of course possible to utilize these firings only as auxiliary firings which have merely the object of heating the furnace and the muffles and which are bricked off when the furnace has reached a red incandescent heat. The normal heating is then effected by special gas inlet pipes to which combustible gas produced outside the furnace proper, is admitted.

In order more clearly to understand the invention reference is made to the accompanying drawings, which illustrate by way of example one embodiment of a zinc furnace with vertical reduction chambers suitable for carrying out the new method of operation, and in which Fig. 1 is a longitudinal sectional elevation. On the left-hand side the section is through the centre of the muffles, whilst on the right-hand side the section is through the heating flues.

Fig. 3 is a lateral elevation of the broad side of a muffle on an enlarged scale (partly in section).

Fig. 4 is a top view, broken-off on the left-hand side.

Fig. 5 is a view of the narrow side (receiver side).

Figure 1:
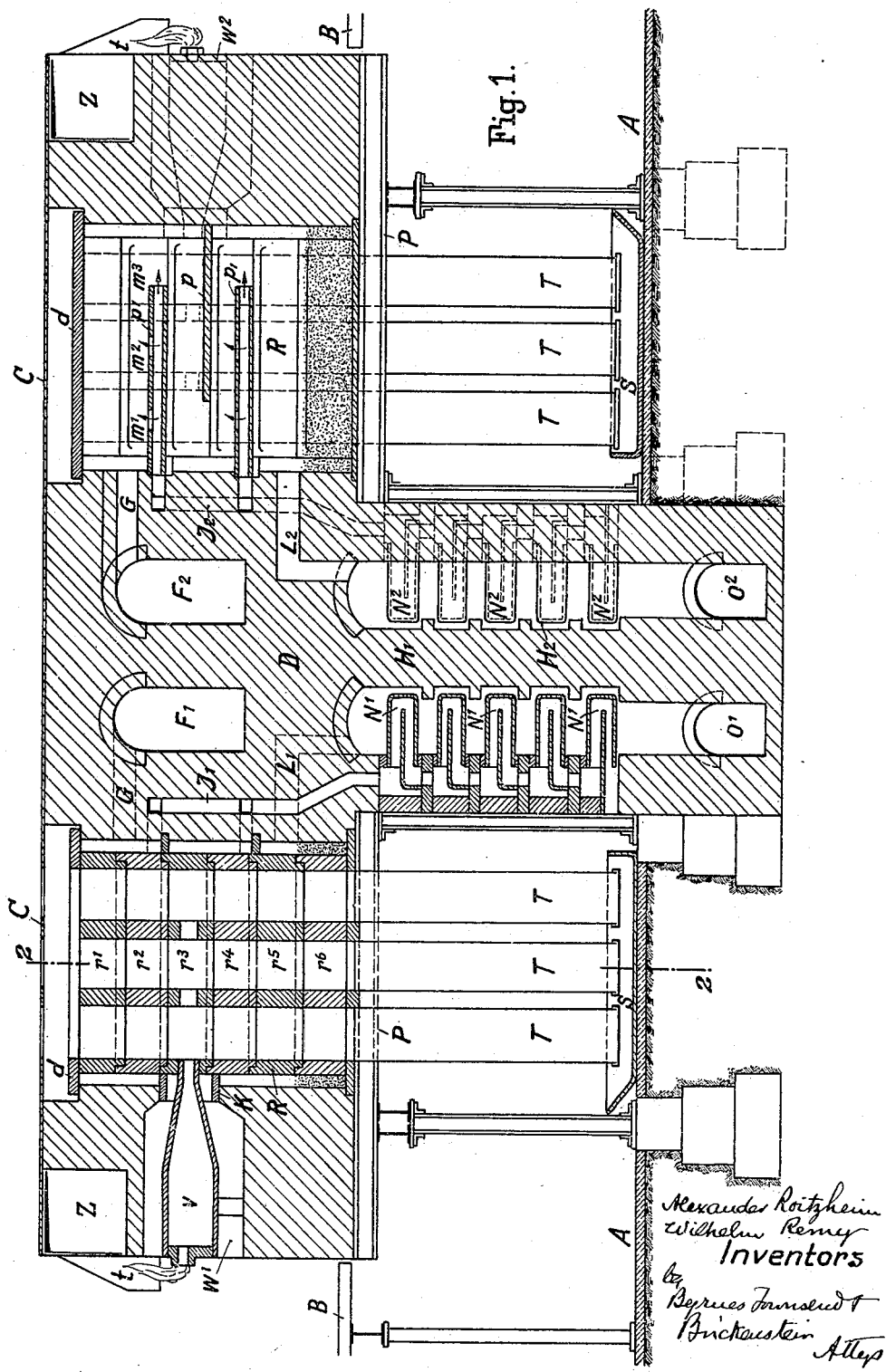
Figure 2:
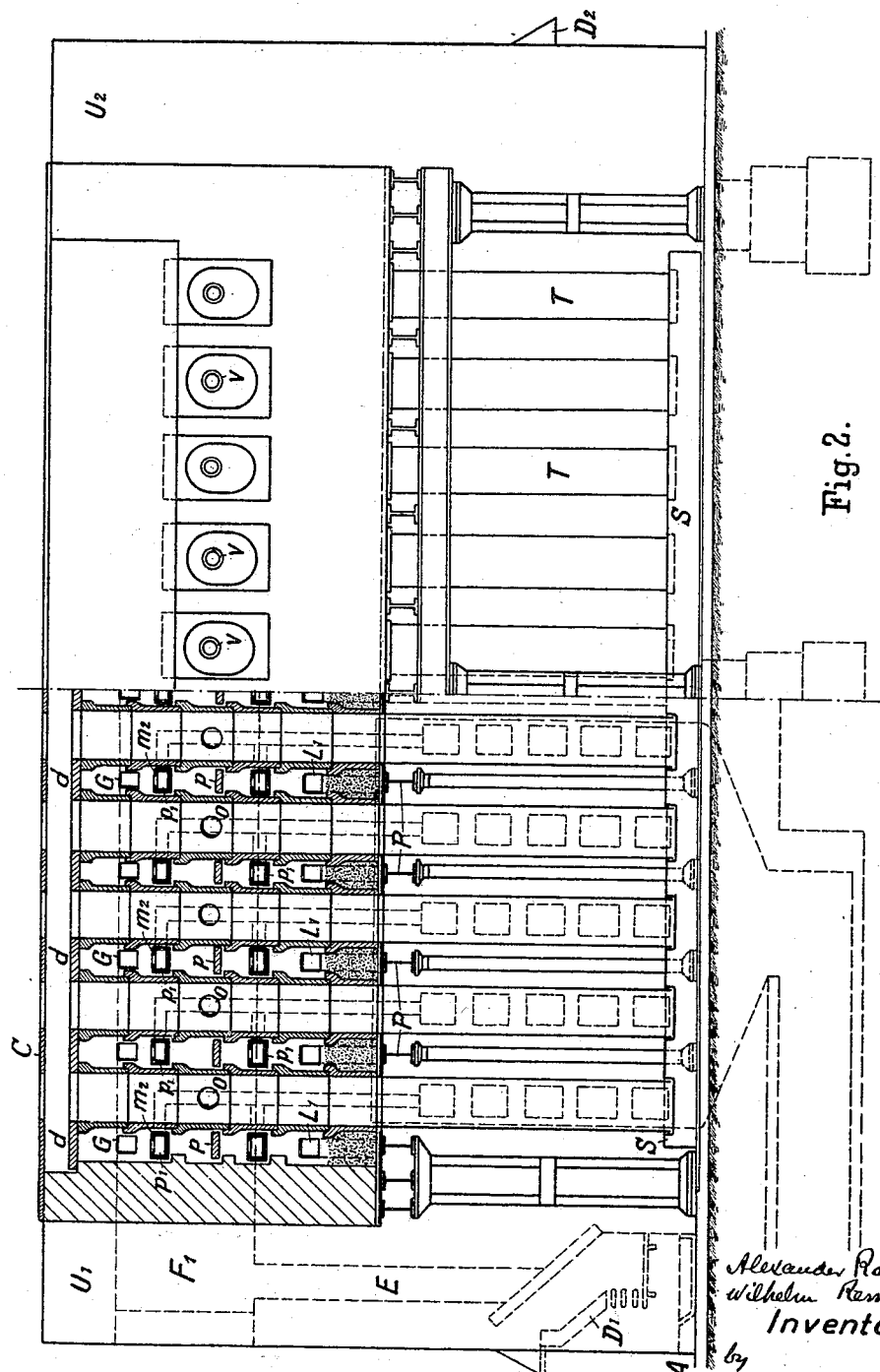
Fig. 2 shows at the left-hand side, a longitudinal section through the furnace of Fig. 1 along the lines 2—2 and on the right-hand side a view of the receiver side.

A indicates the ground of the furnace, B is the working level for attending to the receivers and C is a charging stage. The furnace formed by the lateral surrounding walls $U^1$, $U^2$ and the two sides for the receivers $W^1$, $W^2$, is divided into equal parts by masonry D. Four separate fires are arranged in this masonry for each half of the furnace. Only two, $D^1$ and $D^2$ are shown in the drawings. The firing may for example be of the water gas type. From each combustion chamber a vertical channel (E in Fig. 2) leads upwardly into a horizontal channel $F^1$ and $F^2$ in the central wall D. Flues G lead from the horizontal channels $F^1$ and $F^2$ into the muffle chamber of the furnace and terminate in the uppermost flues between the muffles.

The air is preheated by the air heaters $H^1$, $H^2$ arranged in the masonry D and ascends in the channels $J^1$ and $J^2$ from which distribution channels branch off into the heating flues. The air is distributed over the length of the heating flues through the separating walls $p^1$ constructed from hollow bricks and provided with openings $m^1$, $m^2$, $m^3$. The gas entering the uppermost heating flue consequently does not immediately obtain the total air for combustion required, but only gradually. By this means a long flame is produced and detrimental blow pipe flames are avoided.

The burnt gases pass to the air heater $H^1$ and $H^2$ through the waste gas channels $L^1$ and $L^2$ and play against the tubes $N^1$ and $N^2$ through which fresh air is admitted, and are then discharged through the outlets $O^1$ and $O^2$.

The muffle chamber is supported by a scaffolding P consisting of iron carriers carried by columns in which openings are provided to correspond to the reduction chambers (muffles). The muffles R are mounted upon the scaffolding P independently of the surrounding walls of the furnace and of the central masonry block. The intermediate spaces from muffle to muffle are filled up below with powdered fire clay and the like. This mounting allows the muffles all movement due to heat expansion.

The muffles are composed for example of six parts $r^1$, $r^2$, $r^3$, $r^4$, $r^5$, $r^6$ which abut against each other with horizontal joints. The number of the parts depends on the height of the muffles. The individual parts of the muffles engage with each other by means of feather edges, said feather edges being provided with projections towards the heating flues, upon which projections are mounted the plates $p$ or hollow bricks $p^1$ forming the heating flues and at the top, the cover plates $d$. The cross-section of the muffles is longitudinal (Fig. 4), their walls are as thin as possible towards the heating side in order to enable the heat to penetrate easily. The front and rear walls which are vertical to the thin heating walls of each muffle, are however comparatively thick and moreover in the centre of the cross-section, two or more thick transverse walls $q$ are provided in order to provide the muffle by means of a spine, with the necessary support in the fire. The inner space of the muffle is subdivided by these central transverse or supporting walls $q$. In order to enable the zinc vapours and reduction gases to pass from the thus provided divisions of each muffle towards the one receiver V in the front wall of the muffle, these interior transverse walls $a$ are provided with perforations $o$ at the level of the receiver. The receivers V are inserted into the walls of the muffles facing the front wall of the furnace. Their shape and their closure means are of the type usual in zinc furnaces. In order to protect the receivers V against the combustion gases they are surrounded with annular bricks $k$. In other respects the receivers are similar to those of ordinary zinc furnaces, built into niches and provided in front with slots $t$ for taking up the burning non-condensed gases and vapours which are conducted away through the channels $z$.

The muffles terminate at the bottom in iron pockets T through which the ash descends continuously. The closure means for these pockets are formed by a trough $s$ which may if desired be filled with water to seal off the air completely. From this trough the ash is removed as required.

The roof of the furnace is formed by the plates $d$ resting on the upper edge of the reduction chambers, corresponding openings in the interior of the reduction chambers being left free. Above this are arranged the charging stage C formed by iron carriers or plates which also contain openings corresponding to the openings of the reduction chambers.

On restarting the furnace all reduction chambers and receivers and the tube N of the air heaters are changed. The reduction chambers are built up from the parts $r$ which have only been preliminarily burnt and which are inserted into the furnace in a cold state in the manner shown in Figs. 3 to 5. A permeable construction of known type made from shaped pieces is located in the muffles for conducting the gases and zinc vapours into the receivers (not shown). After closing up all, the furnace is carefully heated up and when it has gradually been brought up to a red incandescent heat uniformly in all parts the muffles are slowly started, the charge being first poor in zinc and rich in reduction coal whereupon the zinc content is gradually increased until the normal charge is finally used.

In normal working, the muffles are charged at the top with a charge mixed with reduction coal at certain intervals after iron rods have been poked several times through the charge in the reduction chamber in various parts, in order to loosen the charge and to cause it to settle down. The fire is constantly maintained uniform so that the reduction chambers are kept as much as possible at the same temperature. The dezincing takes place continuously because fresh particles of the charge, after gradual preheating continually reach the zone of the maximum temperature and sink slowly therethrough. The speed of descent of the charge must be adapted to the dezincing and to the prevailing temperature. The zinc vapours are led away through the permeable constructions into the compartments formed by the transverse walls $q$ of the reduction chambers and reach the receivers where they condense to liquid zinc, whilst the reduction gases accompanying the same, after having been passed through an iron drum in order to deposit the zinc dust, are burnt in air and conducted away or if desired are utilized unburnt. The collected zinc is tapped off as often as desired, normally once a day.

The ashes are discharged in suitable intervals from the trough $s$, or may be continuously removed by conveying devices. The furnace is operated continuously and without interruption in this manner. If, in the course of time, a muffle should become faulty so that zinc losses occur, it is filled with a different material and left. The remaining muffles are used until finally so many muffles have been cut out that the further operation of the furnace becomes unremunerative, when the fire is drawn and the furnace is repaired.

Various modifications may be made in the above described process and apparatus without departing from the spirit and scope of the invention. A short regular alteration (ca. each 20 minutes) from a very high temperature (ca. 1 400° C.) to a low one (ca. 1 100° C.) may, too, be admitted. This change may take place at the whole furnace or between two compartments of the furnace alternatively. In the meaning of the present invention such type of heating is also representing a uniform one.

What we claim is:

1. A zinc reduction furnace comprising an enclosing masonry structure, a multiplicity of spaced, vertical, refractory muffles arranged in said furnace, the muffles being supported independently of each other and of said masonry structure, a roof for the furnace formed by plates carried by the muffles, means for supplying heating gases to the flue spaces between the muffles, and means for supplying additional air to said flue spaces.

2. A zinc reduction furnace as claimed in claim 1 in which the vertical muffles are made in sections having bell-shaped ends, plates forming the flues for the heating gases being supported on said ends.

3. A zinc reduction furnace as claimed in claim 1 in which the vertical muffles are made in sections having bell-shaped ends, plates forming the flues for the heating gases being supported on said ends, and similarly supported plates, extending partially across said flue spaces, the flues and plates being alternately arranged to provide a tortuous passage for the heating gases.

4. A zinc reduction furnace comprising a multiplicity of vertical muffles, the muffles being formed in sections, each section being rectangular in shape and having thin side walls and thick end and transverse walls.

5. A zinc reduction furnace as claimed in claim 4, in which the transverse walls and one end wall of at least one section are provided with openings for escape of zinc vapor, and condensers connected to said end openings.

6. A sectional muffle for zinc furnaces each section being rectangular in shape and having thin side walls and thick end and transverse walls.

7. A zinc reduction furnace comprising an enclosing masonry structure, a multiplicity of spaced vertical refractory muffles arranged in said furnace, the muffles being supported independently of each other and of said masonry structure, and means for supplying heating gases to the flue spaces between the muffles.

8. A zinc reduction furnace as claimed in claim 7 in which refractory powdered material is located between the muffles at their lower portions.

9. A zinc reduction furnace as claimed in claim 7 in which the muffles consist of a plurality of adjacent tubes built up of individual sections, the exterior wall of one of said tubes having an opening, a condenser connector to said opening, the other tubes having openings at the level of the condenser.

In testimony whereof, we affix our signatures.

ALEXANDER ROITZHEIM.
WILHELM REMY.